United States Patent
Carey et al.

(10) Patent No.: US 10,393,397 B2
(45) Date of Patent: *Aug. 27, 2019

(54) DYNAMIC CLIMATE CONTROL ADJUSTMENT SYSTEM

(71) Applicant: INTERNATIONAL BUSINESS MACHINES CORPORATION, Armonk, NY (US)

(72) Inventors: James E. Carey, Rochester, MN (US); Bryan M. Jones, Rochester, MN (US); Aditi Rajagopal, Rochester, MN (US); Ryan L. Rossiter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 419 days.

This patent is subject to a terminal disclaimer.

(21) Appl. No.: 15/191,720

(22) Filed: Jun. 24, 2016

(65) Prior Publication Data
US 2017/0370602 A1    Dec. 28, 2017

(51) Int. Cl.
*F24F 11/00* (2018.01)
*G05B 15/02* (2006.01)
(Continued)

(52) U.S. Cl.
CPC .............. *F24F 11/30* (2018.01); *F24F 11/46* (2018.01); *F24F 11/62* (2018.01); *G05B 15/02* (2013.01);
(Continued)

(58) Field of Classification Search
CPC . G05B 15/02; G05B 2219/2642; G06F 1/163; F24F 11/0034; F24F 11/006; F24F 11/0086; F24F 11/30; F24F 11/46; F24F 11/52; F24F 11/56; F24F 11/62; F24F 11/65; F24F 2011/0035
(Continued)

(56) References Cited

U.S. PATENT DOCUMENTS 5,785,243 A    7/1998  Cross
2002/0153126 A1    10/2002  Clemente
(Continued)

FOREIGN PATENT DOCUMENTS

CN    103335385 A    10/2013
CN    103727636 A    4/2014
(Continued)

OTHER PUBLICATIONS

IBM: List of IBM Patents or Patent Applications Treated As Related (Appendix P), Aug. 17, 2017, pp. 1-2.
(Continued)

*Primary Examiner* — Chun Cao
(74) *Attorney, Agent, or Firm* — Dmitry Paskalov

(57) ABSTRACT

A device detects that a first wearable device has connected to a network. The device receives user preferences from the first wearable device. The device identifies a set point corresponding to a climate parameter. The device receives climate information corresponding to the climate parameter from one or more sensors. The device determines whether the climate information is within a threshold percentage of the set point, and based on the determination that the climate information is not within the threshold percentage of the set point, the device adjusts the set point.

20 Claims, 3 Drawing Sheets

(51) Int. Cl.

| | |
|---|---|
| *F24F 11/30* | (2018.01) |
| *G06F 1/16* | (2006.01) |
| *F24F 11/62* | (2018.01) |
| *F24F 11/46* | (2018.01) |
| *F24F 11/56* | (2018.01) |
| *F24F 11/52* | (2018.01) |
| *F24F 120/12* | (2018.01) |
| *F24F 120/10* | (2018.01) |
| *F24F 120/20* | (2018.01) |
| *F24F 130/10* | (2018.01) |
| *F24F 11/65* | (2018.01) |
| *F24F 140/60* | (2018.01) |
| *F24F 130/00* | (2018.01) |
| *F24F 110/65* | (2018.01) |

(52) U.S. Cl.
CPC ............... *G06F 1/163* (2013.01); *F24F 11/52* (2018.01); *F24F 11/56* (2018.01); *F24F 11/65* (2018.01); *F24F 2110/65* (2018.01); *F24F 2120/10* (2018.01); *F24F 2120/12* (2018.01); *F24F 2120/20* (2018.01); *F24F 2130/00* (2018.01); *F24F 2130/10* (2018.01); *F24F 2140/60* (2018.01); *G05B 2219/2642* (2013.01)

(58) Field of Classification Search
USPC ........................................................ 700/276
See application file for complete search history.

(56) References Cited

U.S. PATENT DOCUMENTS

| | | | | |
|---|---|---|---|---|
| 2008/0121729 | A1* | 5/2008 | Gray | G05D 23/1934 236/51 |
| 2010/0262298 | A1* | 10/2010 | Johnson | F24F 11/001 700/277 |
| 2013/0144470 | A1 | 6/2013 | Ricci | |
| 2014/0032259 | A1* | 1/2014 | LaFever | G06Q 30/0201 705/7.29 |
| 2014/0039691 | A1 | 2/2014 | Gupta et al. | |
| 2014/0135997 | A1 | 5/2014 | Bradley et al. | |
| 2015/0105918 | A1* | 4/2015 | Lee | F24F 11/006 700/276 |
| 2015/0223705 | A1 | 8/2015 | Sadhu | |
| 2016/0004805 | A1 | 1/2016 | Drees et al. | |
| 2016/0048142 | A1 | 2/2016 | Chan et al. | |
| 2016/0056629 | A1 | 2/2016 | Baker et al. | |
| 2016/0193895 | A1* | 7/2016 | Aich | B60H 1/00657 165/202 |
| 2016/0258641 | A1* | 9/2016 | Cheatham, III | F24F 11/006 |
| 2016/0320083 | A1 | 11/2016 | Windgassen | |
| 2017/0321921 | A1* | 11/2017 | Chen | G05D 23/00 |
| 2017/0370604 | A1* | 12/2017 | Carey | F24F 11/30 |

FOREIGN PATENT DOCUMENTS

| | | |
|---|---|---|
| CN | 204100488 U | 1/2015 |
| CN | 104633860 A | 5/2015 |

OTHER PUBLICATIONS

Carey et al., Pending U.S. Appl. No. 15/660,189, filed Jul. 26, 2017, titled "Dynamic Climate Control Adjustment System", pp. 1-20.
Carnegie Mellon, "Smart Thermostat", Device Responds to Bio-Signals, http://www.cmu.edu/homepage/practical/2007/fall/smart-thermostat.shtml, Printed Apr. 21, 2016, p. 1.

* cited by examiner

DYNAMIC CLIMATE CONTROL ADJUSTMENT SYSTEM

BACKGROUND

The present invention relates generally to dynamic climate control adjustment system, and more particularly to real time adjustment of the climate control system parameters such as temperature, humidity, oxygen (fresh air supply) based on various wearable sensors connected to the wireless network in order to provide comfort to the user and save energy.

Climate control systems are designed to provide thermal comfort and acceptable air quality indoors. These systems integrate heating, humidifying, ventilating and air conditioning (HVAC) systems that incorporate a controller and various sensors to maintain the user preferred parameters such as temperature by comparing the readings from thermostat and other sensors, in order to maintain a user preferred environment set by the user in the climate control controller.

Climate control systems are designed not only to provide comfort but also to save energy therefore, climate control controller can be adjusted to maintain different temperatures during day and night time, turn on or off the system when someone opens the door and enters or leaves the space that is controlled by the system.

SUMMARY

Embodiments of the present invention provide a system, method, and program product for a dynamic climate control adjustment system. A device detects that a first wearable device has connected to a network. The device receives user preferences from the first wearable device. The device identifies a set point corresponding to a climate parameter. The device receives climate information corresponding to the climate parameter from one or more sensors. The device determines whether the climate information is within a threshold percentage of the set point, and based on the determination that the climate information is not within the threshold percentage of the set point, the device adjusts the set point.

DETAILED DESCRIPTION

Aspects of the present invention, as appreciated by the one skilled in the art, may be embodied as a system, method, or computer product. Accordingly, aspects of the present invention may take the form of an embodiment combining software (including firmware, resident software, microcode, etc.) and hardware aspects all generally be referred to as a "module", "method" or "system." Furthermore, aspects of the present invention may take the form of a computer program product embodied in one or more computer-readable medium(s) having computer-readable program code/instructions embodied thereon including controllers, microcontrollers and wearable device processing units.

Various aspects of the present invention are described below with reference to flowchart illustrations and/or block diagrams of methods, apparatus (system) and computer program products. Embodiments of the present invention will now be described in detail with reference to the accompanying Figures.

Figure 1:
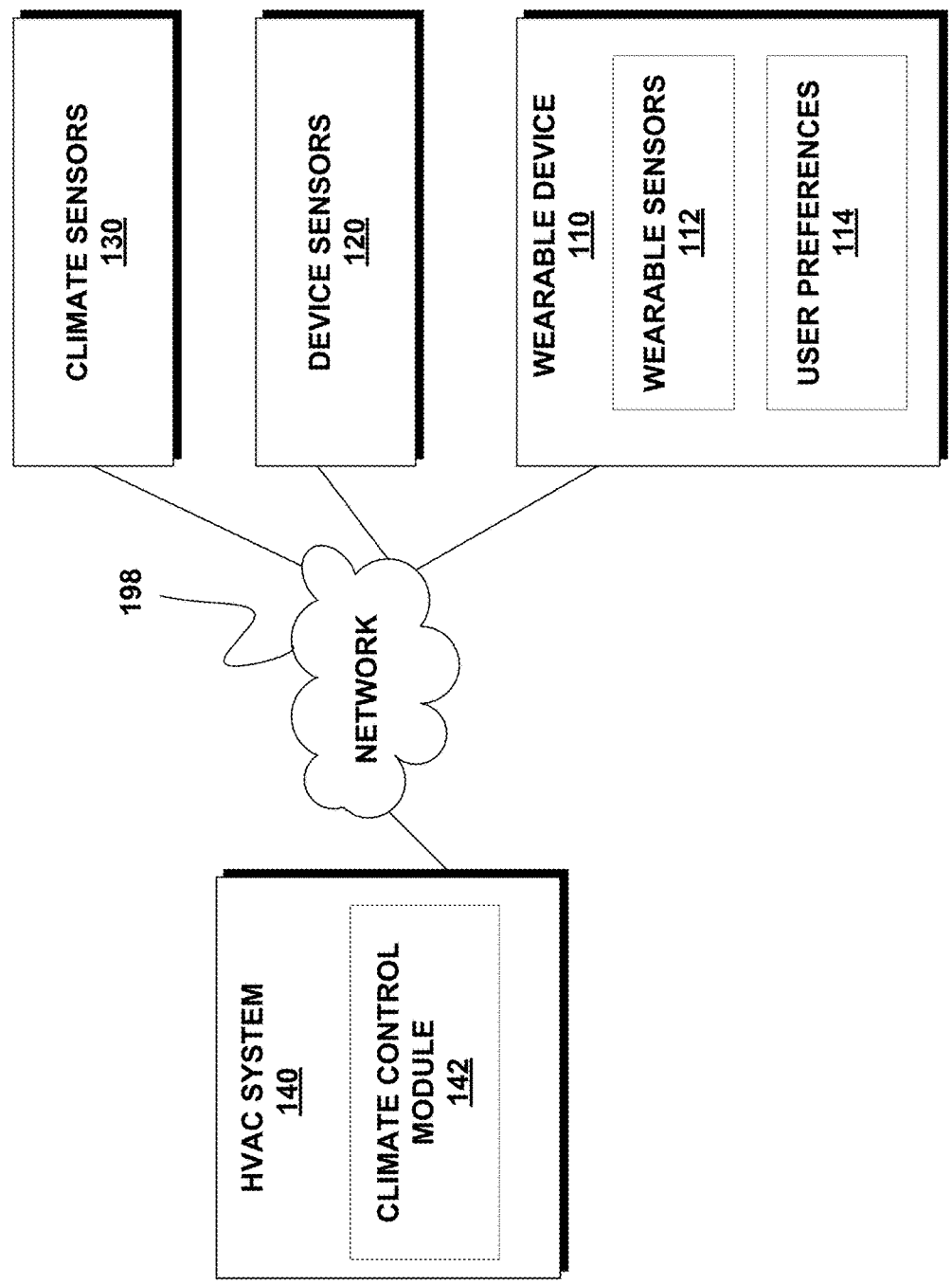
FIG. 1 illustrates a dynamic climate control adjustment system 100, in accordance with an embodiment of the invention.

FIG. 1 illustrates a dynamic climate control adjustment system 100, in accordance with an embodiment of the invention. In an example embodiment, dynamic climate control adjustment system 100 includes HVAC system 140 for controlling a climate at a confined area divided to an HVAC controlled zones, climate sensors 130, wearable device 110 and device sensors 120 (i.e. alarm system sensors, oven door or oven temperature sensors, refrigerator door sensor, window position sensors, etc.), all interconnected via network 198.

In accordance with an embodiment of the invention, network 198 is an intranet, a local area network (LAN), or a wide area network (WAN). Network 198 may include, for example, wired, wireless (such as Wi-Fi, Bluetooth, or combined) or fiber optic connections. In other embodiments, network 198 may be implemented as the Internet, representing a worldwide collection of networks and gateways to support communications between devices connected to the Internet or other type of network either wired or wireless which allows the communications between devices of the system 100. In general, network 198 may be any combination of connections and protocols that will support communications between climate control module 142, climate sensors 130, alarm system sensors 122, wearable device 110, and device sensors 150. In another embodiment, network 198 may represent a network of physical objects that enables these objects to collect and exchange data.

Climate sensors 130 is an electronic device that has a sensor, or an array of sensors, that are located and measure the relevant values inside the HVAC system controlled zones. Climate sensors 130 are capable of measuring, for example, temperature, humidity, and/or oxygen levels of the HVAC controlled zones, and transmit the measurements to climate control module 142 either via network 198 or otherwise (such as by direct wired connection).

Device sensors 120, are sensors that may transmit information pertaining to devices located in the HVAC controlled zone and may affect the data that is used by the system to calculate the correct set points of each zone in the climate control module 142. For example device sensors 120 may include, an oven sensor that transmits information such as an oven temperature, an oven door position status, a refrigerator door sensor, an alarm system sensor, a movement sensors of the alarm system in a particular zone, a windows position sensors, an entry doors position sensors, a smoke detector sensors, oxygen sensors.

Wearable device 110 includes wearable sensors 112 and user preferences 114. Wearable device 110 is an accessory or article of clothing incorporating computer and electronic technologies and wearable sensors 112 for detecting various health related information about the user which may be used by climate control module 142 to adjust the comfort in the HVAC system 140 controlled zone(s). In addition, wearable device 110 may store user preferences 114 that contain information related to user climate preferences. In an example embodiment, wearable device 110 may be, for example, a gadget such as a smart watch, a blocks modular watch, smart glasses, another type of wearable device, or alternatively a mobile device.

Wearable sensors 112, are sensors that are integrated or connected to wearable device 110 and may measure, directly or indirectly, various body and/or surrounding factors such as temperature, heart rate, calorie burning rate, humidity, oxygen, and location. These sensors may be used to determine the specific location of the user and his surrounding climate.

User preferences 114 is information, identified and stored by wearable device 110. This information may include user preferred climate values and user body status such as, for example, preferred surrounding temperature, humidity levels, current activity level, metabolic rate, weight, and height. This data may be either defined by the user or determined by device sensors 120 and/or climate sensors 130. In other embodiments, user preferences 114 may be stored, accessed and updated by climate control module 142 or on another device that is connected to the network 198, with user preferences 114 being associated with a wearable device unique identification number (i.e. by MAC address).

According to an embodiment, HVAC system 140 is a climate control apparatus that may control and maintain air temperature, water temperature, humidity, ventilation, fresh air supply (oxygen) in order to provide comfortable or pre-defined environment. In an example embodiment, HVAC system 140 may incorporate air conditioning and heating system, ventilation system, humidifying system that may control the climate of one or multiple zones independently according to user defined or determined set points. Set points are the values of climate parameters such as temperature, humidity, oxygen level that are input by a user or administrator of HVAC system 140 with regard to each zone or all zones. For example, an administrator of HVAC system 140 may input a set point value pertaining to the temperature of a room (zone 1). In this example, HVAC system 140 would maintain the temperature of the room to be equal to or within a threshold percentage of the input set point. The determination and adjustment of the set points in each zone is determined by climate control module 142. According to an embodiment, the zones where HVAC system 140 operates are pre-defined by the user or administrator. In another embodiment, the zones of HVAC system 140 may be determined by the climate control module 142 by analyzing the historical data from each sensor and arranging them into zones if their readings are within the same threshold over time. For example, if the values from both first and second thermostat are the same or within a threshold of one degree over time, HVAC system 140 will assume that both of these thermostats are in the same zone.

Climate control module 142 is a software operating a controller, a micro-controller, or a computer that controls the operations of the HVAC system 140. Climate control module 142 determines and maintains the preferred climate set points defined by the user or determined from various sensors and parameters. In an example embodiment, climate control module 142 is a program, integrated in HVAC system 140. In other embodiments, climate control module 142 may be located on a computer, micro-controller or other programmable or preprogrammed device that may connect, adjust or change the performance of HVAC system 140 via network 198 or other wired or wireless connection. Climate control module 142, receives information from all of the devices connected to the network 198 and adjusts the HVAC system 140 set points in accordance with the information processed by climate control module 142. According to an embodiment, HVAC system 140 is initially set up by the user or administrator and then optimized, adjusted, and controlled based on the program (software) contained in climate control module 142, using information received from devices such as climate sensors 130, wearable sensors 112, user preferences 114, and other device sensors 120 connected to network 198. The set points adjusted by a climate control module 142 may be maintained by HVAC system 140 feedback controller in accordance to the information received from various sensors. For example, fixed frequency air conditioner ("AC") may be controlled by simply turning it on until the temperature (set point) is reached, while more energy efficient inverter controlled AC system may be adjusted using PID (proportion, integration, differentiation) controller.

In the example embodiment, climate control module 142 is a program that receives information from sensors and devices connected to the network 198 and adjusts the HVAC system 140 set points. The operations and functions of Climate Control Module 142 ("CCM 142") that receives the information, analyzes it and adjusts preferred set points for various climate zones controlled by the HVAC system 140 is described in further detail below with regard to FIG. 2.

Figure 2:
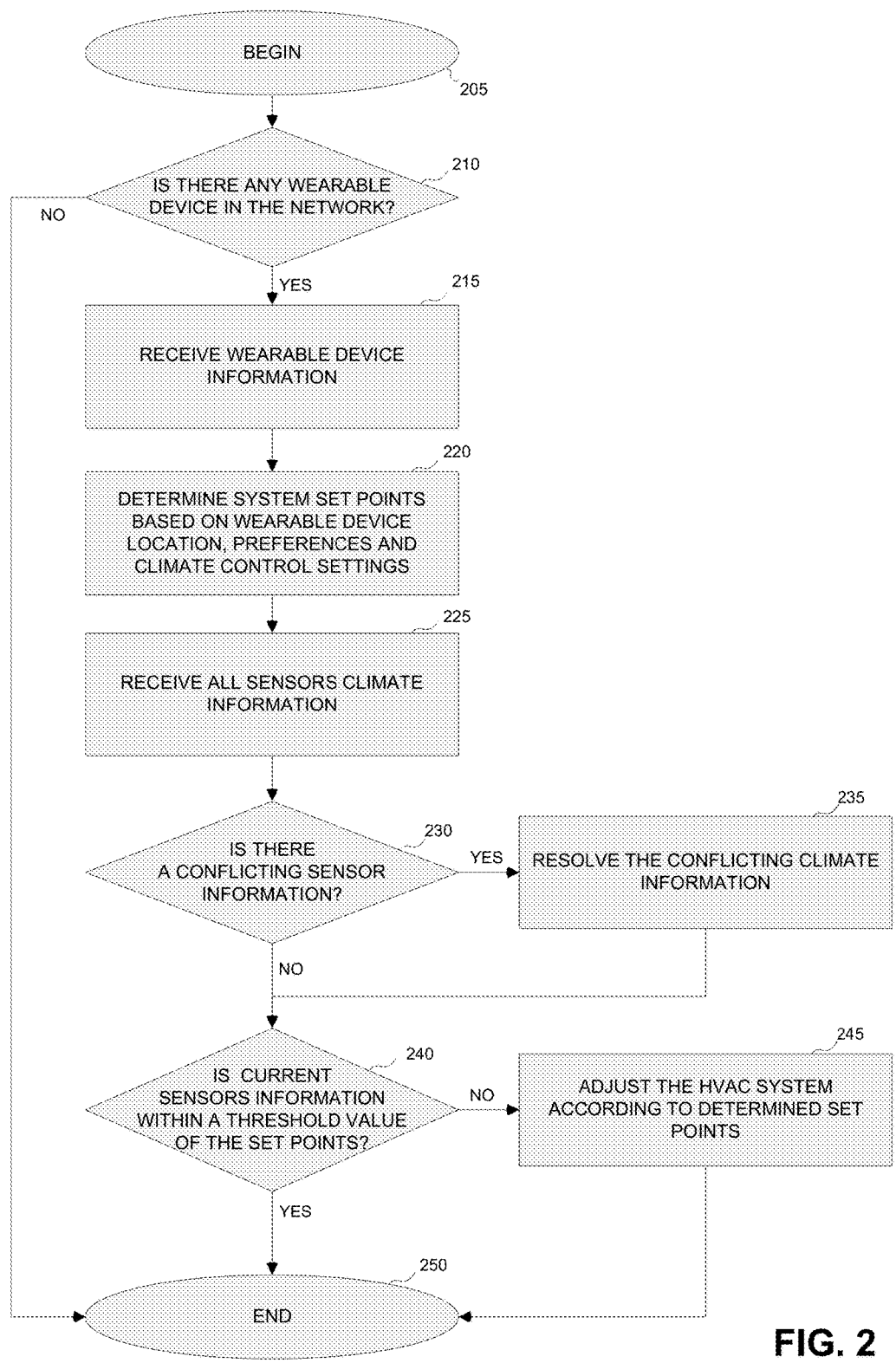
FIG. 2 is a flowchart, illustrating the operations of the climate control module of FIG. 1, in accordance with an embodiment of the invention.

FIG. 2 is a flowchart illustrating the operations of CCM 142 that adjusts and controls the HVAC system 140. Referring to step 205, CCM 142 is an addition to the existing software which may be either integrated or a stand-alone program executed by the climate control module 142. In accordance with the embodiment, CCM 142 may be executed either in a loop with a time delay (i.e. every minute), or when a specific signal is received by CCM 142 or both. For example, every several minutes CCM 142 determines whether there is a wearable device 110 connected or attempts to connect to network 198. In other embodiments, CCM 142 may be executed when the user presses a button on an HVAC system 140 panel or executes an application on a wearable device 110 that sends information to climate control module 142.

Referring to decision 210, CCM 142 checks if a wearable device 110 is connected to network 198 in order to determine whether set points adjustment may be required. According to an embodiment, CCM 142 monitors the network to identify if any wearable device, such as wearable device 110, connects to network 198. In another embodiment, CCM 142 may determine the location of the wearable device and determine whether the device is in the climate zone that is controlled by the HVAC system 140. If there is at least one wearable device 110 in network 198 (decision 210, "Yes" branch), CCM 142 proceeds to step 215. If there are no wearable devices in network 198 (decision 210, "NO" branch), CCM 142 proceeds to step 250.

Referring to step 215, CCM 142 receives information from wearable device 110 that includes user preferences 114 and information from wearable sensors 112. Information received from wearable sensors 112 may include user location, user body and environment temperatures, humidity, light, and other metabolic information such as heart rate, oxygen level, and pressure. User preferences 114 may contain user preferred temperature, oxygen, and humidity set points and user's age, medical condition requirements and his overall priority level. In accordance with an embodiment, this information is used by the CCM 142 for HVAC system 140 set point adjustments. Metabolic data, such as heart rate may be used in order to determine that the user is either asleep or involved in a sport-related activity which may require an adjustment to the climate set points in the respective zone. The information regarding user's age, medical conditions and overall priority is required not only to prioritize between many wearable devices in the same zone and notify other users in the same zone through network 198 (i.e. older person's priorities overrule other user's priorities) but also to prioritize adjustment of specific set point. For example, if user A has a medical condition that requires a certain level of oxygen in the air while the user B is older and has a higher priority, the CCM 142 will adjust the set point of fresh air supply according to user A requirements while all the other climate adjustments will be according to B's user preferences because he a higher general priority due to his age.

Referring to step 220, CCM 142 adjusts the system set points based on the location of wearable device 110 and user preferences 114 associated with wearable device 110 and the pre-defined set points associated with HVAC system 140. In accordance with an embodiment, CCM 142 determines the zone where the user is located, based on communicating with wearable device 110, and then adjusts a set point (or more than one set point) of the HVAC system 140 for that zone based on user preferences 114. For example, if the user of wearable device 110 is located in zone 1 (with no other devices detected as connected to network 198), CCM 142 retrieves user preferences 114 and adjusts the temperature (if needed) only in the zone where the user is located and may reduce or turn off the system in other zones. If there are several wearable devices in the same zone the CCM 142 prioritizes and adjusts the set point in accordance to the wearable device corresponding to the highest priority, which are pre-defined by the administrator of HVAC system 140 or another administrator. Furthermore, the users of the respective wearable devices detected in the network that do not have the highest priority are notified by CCM 142 that their preferences were not taken into account when adjusting the set point(s) of the zone(s). In other embodiment, the set point may be adjusted by averaging corresponding values contained in each of the user preferences corresponding to the wearable devices detected in the network and determining an average value for each preference. CCM 142 may then adjust the set point to equal the average value or be within a threshold percentage of the average value. In further embodiment, CCM 142 may adjust each individual set point by prioritizing each wearable device 110 according to the user medical condition. For example, if A has a medical condition that requires him to be in an environment of 80 degrees Fahrenheit while user B has a medical condition that requires him to be in environment with 50% humidity the CCM 142 will create a set point of temperature according to user A preferences and humidity according to user B preferences and notify the user A that his humidity preferences were not selected and notifying user B that his temperature preferences were not selected. Highest or absolute priority may be determined by, for example, a user's age, his medical condition, or by pre-defined priority between the wearable devices. For example, if user A preferences includes information that he is 80 years old and user B has user preferences 114 that includes information that she is 30 years old and both A and B are in the same zone controlled by the HVAC system 140, then CCM 142 may create a set point according to Alpha's preferences only if the age was chosen as absolute priority and send notification to Beta's device that his preferences were not selected or the selected preferences values. In another embodiment, in addition to wearable devices priority, the priority of each sensor may be predetermined by the administrator or a user of HVAC system 140, while the user of a wearable device 110 may update it. For example, if the oxygen sensor has an absolute priority and an oxygen level is below the defined value in a corresponding set point, the HVAC system 140 will ventilate the space even if user preferences 114 of a wearable device 110 determines otherwise. In further embodiment, if user preferences 114 deviate from the climate control module 142 parameters then the HVAC system 140 will, if possible, create a set point in the zone where the user is located in accordance to user preferences 114 while all the other zones of the HVAC system 140 will be turned off to save energy. In another embodiment, if the adjustment would require a change that exceeds a threshold percentage with respect to the set point associated with HVAC system 140, CCM 142 may not make an adjustment to the set point. In the example embodiment, the threshold percentage is 10%, however, in other embodiments, the threshold percentage may be another value. For example, if after analyzing the received user preferences for one or more wearable devices, the average value for the temperature of a zone is 30 degrees Fahrenheit more than the set point of 70 degrees, CCM 142 will not adjust the set point since the change required exceeds the 10% threshold percentage.

Referring to step 225, CCM 142 receives climate information from all sensors in the zone where the wearable device(s) 110 is located. This includes receiving information from sensors such as climate sensors 130, device sensors 120 and wearable sensors 112 information. The received climate information is used by CCM 142 to analyze the climate surroundings of the user(s) and to eliminate false sensor readings before HVAC system 140 set points adjustments.

Referring to decision 230, CCM 142 determines if there is conflicting information being received from a sensor. The climate information received from the sensors may be arranged in accordance to the corresponding zones and if CCM 142 determines that within a respective zone there is at least one reading of the same type (i.e. temperature readings) from a particular sensor(s) that deviates considerably from an average of the readings obtained from the other sensors, from an average of previous readings taken from the particular sensor or from an average of previous readings taken from the same zone proceed to step 235. If all the readings are consistent to one to another and there are no errors, proceed to decision 240. According to an embodiment, CCM 142 may analyze the information statistically to determine whether the data points (readings) deviate considerably based on previous data points from the same location or if the data points deviate by a pre-defined range from the information received by climate sensors 130 or wearable sensors 112 in the same zone. For example, if CCM 142 received information that an oven door is open and the wearable device temperature sensor transmits a high temperature measurement (data points) while other temperature sensors in the same zone show no significant change, the CCM 142 will determine that this reading is conflicting and deviates from the expected value (outlier). In further embodiment, CCM 142 may determine the information as conflicting if in the same zone device sensors 120 may have influenced the climate sensors 130 information. For example if in zone 1 there is an oven with a door sensor and the information received from the climate sensors 130 of zone 1 show sudden increase in temperature after the determination that the oven door is open the CCM 142 will determine that this information received from a climate sensors 130 is conflicting.

Referring to step 235, CCM 142 resolves the conflicting climate information. When several readings from same type of climate sensors 130 at the same zone have different values or when the same sensor has sudden change of value of more than predefined threshold the CCM 142 will exclude this information from affecting the set point adjustment.

Referring to decision 240, CCM 142 determines if current sensor information is within a threshold value of the respective set points defined by the user or administrator of an HVAC system 140. According to the example embodiment, CCM 142 compares the HVAC system 140 set points for each zone to an updated set points determined by the CCM 142. If the current settings of CCM 142 are within a defined threshold percentage of the HVAC system 140 set points (Step 220), CCM 142 proceeds to step 235 and exits the program. In the example embodiment, the defined threshold percentage is 5%. In other embodiments, the defined threshold percentage may be another percentage value. If CCM 142 settings are not within the defined threshold percentage of the determined HVAC system 140 set points proceed to step 245.

Referring to step 245, CCM 142 adjusts the set points of the HVAC system 140 in the corresponding zone(s) to a determined set points based on wearable device(s) 110 connected to network 198 (step 220). According to the example embodiment, CCM 142 saves the existing set points determined by the HVAC system 140 user or administrator and adjusts the set points to a determined set points based on wearable device(s) 110. When a wearable device(s) 110 disconnects from network 198 or leaves the zone, CCM 142 restores the saved values of the pre-determined set points in that zone(s).

Figure 3:
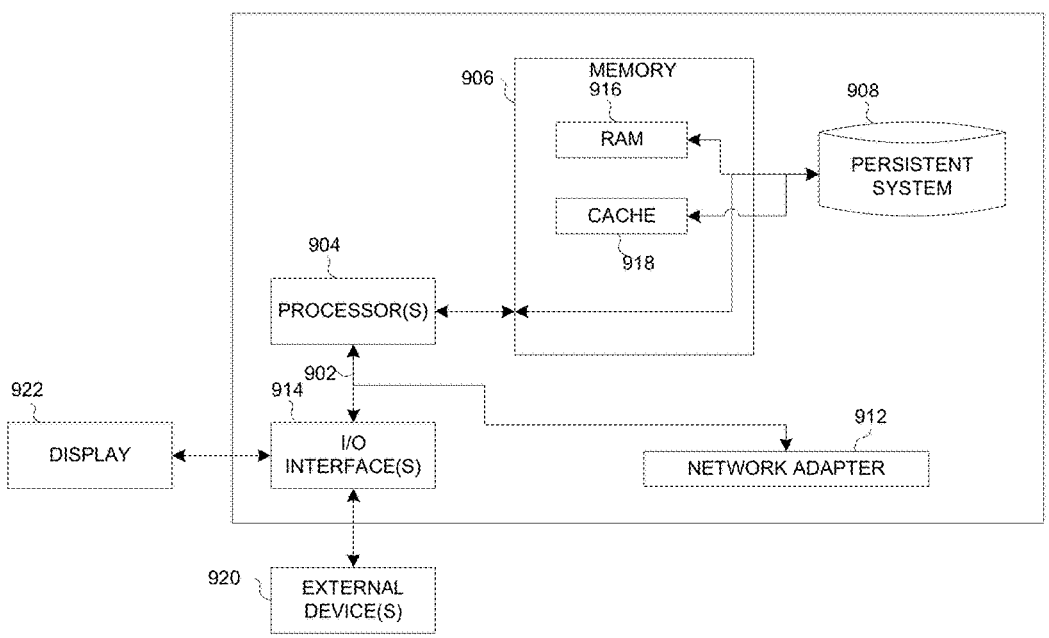
FIG. 3 is a block diagram depicting the hardware components of the dynamic climate control adjustment system 100 of FIG. 1, in accordance with an embodiment of the invention.

FIG. 3 depicts a block diagram of components, such as climate control module 142, wearable device 110, and device sensors 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

A climate control module 142, wearable device 110, and device sensors 120 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

Climate control module program (CCM 142) and user preferences 114 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. Climate control module program (CCM 142), user preferences 114 may be downloaded to persistent storage 908 through communications unit 912.

I/O interface(s) 914 allows for input and output of data with other devices that may be connected to climate control module 142, wearable device 110, and device sensors 120. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., CCM 142, user preferences 114 may be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling a climate, the method comprising:
    detecting that a first wearable device has connected to a network, wherein the first wearable device is an accessory or an article of clothing incorporating a computer and wherein the first wearable device includes wearable sensors and user preferences, wherein the user preferences comprise age of a user, a user preferred temperature, and a user preferred humidity, and wherein the wearable sensors comprise a sensor to determine a location of the user, a sensor to determine a surrounding climate, and a sensor to determine metabolic data of the user;
    receiving the user preferences from the first wearable device;
    identifying a set point corresponding to a climate parameter, wherein the climate parameter determined from the user preferences;
    receiving climate information corresponding to the climate parameter from one or more sensors;
    determining whether the climate information is within a threshold percentage of the set point; and
    based on determining that the climate information is not within the threshold percentage of the set point, adjusting the set point.

2. The method of claim 1, further comprising:
    determining a location of the first wearable device;
    determining a zone corresponding to the first wearable device based on the location of the first wearable device; and
    wherein adjusting the set point comprises adjusting the set point in the zone.

3. The method of claim 1, further comprises:
detecting that a second wearable device has connected to a network;
receiving the user preferences corresponding to the second wearable device;
determining a priority of the first wearable device is higher than the priority of the second wearable device, wherein the priority of the first wearable device is determined from a medical condition, and wherein the medical condition is determined from the age of the user and the metabolic data; and
adjusting the set point based on the user preferences of the first wearable device.

4. The method of claim 3, further comprising based on determining a priority of the first wearable device is higher than the priority of the second wearable device, notifying the second wearable device.

5. The method of claim 1, further comprising:
determining an outlier in the climate information; and
removing the outlier from the climate information.

6. The method of claim 5, wherein determining the outlier comprises:
determining a data point in the climate information deviates from an expected value;
receiving system information from a device sensor; and
determining the system information caused the data point to deviate from the expected value.

7. The method of claim 5, wherein determining the outlier in the climate information comprises:
determining a change in system information from a device sensor;
determining the outlier in the climate information is based on the change in system information.

8. A computer program product for controlling a climate, the computer program product comprising:
one or more computer-readable storage devices and program instructions stored on at least one of the one or more tangible storage devices, the program instructions comprising:
program instructions to detect that a first wearable device has connected to a network, wherein the first wearable device is an accessory or an article of clothing incorporating a computer and wherein the first wearable device includes wearable sensors and user preferences, wherein the user preferences comprise age of a user, a user preferred temperature, and a user preferred humidity, and wherein the wearable sensors comprise a sensor to determine a location of the user, a sensor to determine a surrounding climate, and a sensor to determine metabolic data of the user;
program instructions to receive the user preferences from the first wearable device;
program instructions to identify a set point corresponding to a climate parameter, wherein the climate parameter determined from the user preferences;
program instructions to receive climate information corresponding to the climate parameter from one or more sensors;
program instructions to determine whether the climate information is within a threshold percentage of the set point; and
based on program instructions to determine that the climate information is not within the threshold percentage of the set point, program instructions to adjust the set point.

9. The computer program product of claim 8, further comprising:
program instructions to determine a location of the first wearable device;
program instructions to determine a zone corresponding to the first wearable device based on the location of the first wearable device; and
wherein program instructions to adjust the set point comprises program instructions to adjust the set point in the zone.

10. The computer program product of claim 8, further comprising:
program instructions to detect that a second wearable device has connected to a network;
program instructions to receive the user preferences corresponding to the second wearable device;
program instructions to determine a priority of the first wearable device is higher than the priority of the second wearable device, wherein the priority of the first wearable device is determined from a medical condition, and wherein the medical condition is determined from the age of the user and the metabolic data; and
program instructions to adjust the set point based on the user preferences of the first wearable device.

11. The computer program product of claim 10, further comprising based on program instruction to determine a priority of the first wearable device is higher than the priority of the second wearable device, program instructions to notify the second wearable device.

12. The computer program product of claim 8, further comprising:
program instructions to determine an outlier in the climate information; and
program instructions to remove the outlier from the climate information.

13. The computer program product of claim 12, wherein program instructions to determine the outlier comprises:
program instructions to determine a data point in the climate information deviates from an expected value;
program instructions to receive system information from a device sensor; and
program instructions to determine the system information caused the data point to deviate from the expected value.

14. The computer program product of claim 12, wherein program instructions to determine the outlier in the climate information comprises:
program instructions to determine a change in system information from a device sensor;
program instructions to determine the outlier in the climate information is based on the change in system information.

15. A computer system for controlling a climate, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to detect that a first wearable device has connected to a network, wherein the first wearable device is an accessory or an article of clothing incorporating a computer and wherein the first wearable device includes wearable sensors and user preferences, wherein the user preferences comprise age of a user, a user preferred temperature, and a user preferred humidity, and wherein the wearable sensors comprise a sensor to determine a location of the user, a sensor to determine a surrounding climate, and a sensor to determine metabolic data of the user;

program instructions to receive the user preferences from the first wearable device;

program instructions to identify a set point corresponding to a climate parameter, wherein the climate parameter determined from the user preferences;

program instructions to receive climate information corresponding to the climate parameter from one or more sensors;

program instructions to determine whether the climate information is within a threshold percentage of the set point; and based on program instructions to determine that the climate information is not within the threshold percentage of the set point, program instructions to adjust the set point.

16. The computer system of claim 15, further comprising:
program instructions to determine a location of the first wearable device;
program instructions to determine a zone corresponding to the first wearable device based on the location of the first wearable device; and
wherein program instructions to adjust the set point comprises program instructions to adjust the set point in the zone.

17. The computer system of claim 15, further comprising:
program instructions to detect that a second wearable device has connected to a network;
program instructions to receive the user preferences corresponding to the second wearable device;
program instructions to determine a priority of the first wearable device is higher than the priority of the second wearable device, wherein the priority of the first wearable device is determined from a medical condition, and wherein the medical condition is determined from the age of the user and the metabolic data; and
program instructions to adjust the set point based on the user preferences of the first wearable device.

18. The computer system of claim 17, further comprising based on program instruction to determine a priority of the first wearable device is higher than the priority of the second wearable device, program instructions to notify the second wearable device.

19. The computer system of claim 15, further comprising:
program instructions to determine an outlier in the climate information; and
program instructions to remove the outlier from the climate information.

20. The computer system of claim 19, wherein program instructions to determine the outlier comprises:
program instructions to determine a data point in the climate information deviates from an expected value;
program instructions to receive system information from a device sensor; and
program instructions to determine the system information caused the data point to deviate from the expected value.

* * * * *